US010450021B2

(12) United States Patent
Anuth et al.

(10) Patent No.: US 10,450,021 B2
(45) Date of Patent: Oct. 22, 2019

(54) ANTI-THEFT LOCK FOR TWO-WHEEL VEHICLES

(71) Applicant: Haveltec GmbH, Brandenburg an der Havel (DE)

(72) Inventors: Christian Anuth, Brandenburg an der Havel (DE); Markus Weintraut, Brandenburg an der Havel (DE); Christian Werner, Potsdam (DE)

(73) Assignee: Haveltec GmbH, Brandenburg an der Havel (DE)

(*) Notice: Subject to any disclaimer, the term of this patent is extended or adjusted under 35 U.S.C. 154(b) by 0 days.

(21) Appl. No.: 15/570,165

(22) PCT Filed: Apr. 1, 2016

(86) PCT No.: PCT/EP2016/057254
§ 371 (c)(1),
(2) Date: Oct. 27, 2017

(87) PCT Pub. No.: WO2016/173804
PCT Pub. Date: Nov. 3, 2016

(65) Prior Publication Data
US 2018/0118294 A1 May 3, 2018

(30) Foreign Application Priority Data

Apr. 29, 2015 (DE) .................. 10 2015 005 419

(51) Int. Cl.
*B62H 5/14* (2006.01)
*B62H 5/00* (2006.01)
(Continued)

(52) U.S. Cl.
CPC ............. *B62H 5/147* (2013.01); *B62H 5/003* (2013.01); *B62H 5/20* (2013.01); *G07C 9/00571* (2013.01);
(Continued)

(58) Field of Classification Search
CPC ..... Y10T 70/409; Y10T 70/40; Y10T 70/435; Y10T 70/483; Y10T 70/5872;
(Continued)

(56) References Cited

U.S. PATENT DOCUMENTS

2004/0119583 A1* 6/2004 Linden .................. B62H 5/20
340/432
2010/0075655 A1 3/2010 Howarter et al.
(Continued)

FOREIGN PATENT DOCUMENTS

DE   20316619 U1   3/2004
DE   102004054331 A1   6/2005
(Continued)

OTHER PUBLICATIONS

Johnson.; "ScatoLOCK: Automatic Bike Lock with Hidden Smart Key." BikeShopHub Blog; Apr. 1, 2013; https://www.bikeshophub.com/blog/2013/04/01/scatolock-automatic-bike-lock-with-hidden-smart-key ; Date retrieved Jun. 15, 2016.
(Continued)

*Primary Examiner* — Emily C Terrell
(74) *Attorney, Agent, or Firm* — Thorpe North and Western, LLP

(57) ABSTRACT

An anti-theft lock for bicycles and other vehicles powered by a person, which lock can be switched over from a locking state into a move state, containing means for tamper-proof attachment of the lock to the vehicle, and a control unit for switching over the lock from the locking state into the move state, and vice versa, is characterized in that the control unit has a receiver for signals of an associated mobile transmitter which are transmitted in a wireless fashion and means for determining the distance of said control unit from the mobile transmitter; the control unit switches over the lock into the locking state if the distance exceeds a threshold value and
(Continued)

the vehicle is simultaneously not travelling; and the control unit switches over the lock into the move state if the distance undershoots a threshold value.

20 Claims, 18 Drawing Sheets

(51) Int. Cl.
  *B62H 5/20* (2006.01)
  *G07C 9/00* (2006.01)
  *E05B 47/00* (2006.01)
(52) U.S. Cl.
  CPC ............... *E05B 2047/0094* (2013.01); *G07C 2009/00793* (2013.01)
(58) Field of Classification Search
  CPC ....... Y10T 70/7102; B62H 5/00; E05B 71/00; E05B 47/0012; E05B 73/0011; E05B 2047/0016; E05B 2047/0096; G07C 9/00896; G07C 2209/08; G07C 9/00182; G07C 9/00571; G07F 17/00; G07F 17/0057; G07F 7/08; B62J 3/00; G01S 19/16
  USPC ........................................ 340/5.61
  See application file for complete search history.

(56) References Cited

U.S. PATENT DOCUMENTS

| | | | |
|---|---|---|---|
| 2014/0266588 A1* | 9/2014 | Majzoobi | E05B 47/0012 340/5.61 |
| 2015/0091698 A1 | 4/2015 | Du | |
| 2015/0204112 A1* | 7/2015 | Salzmann | B62H 5/003 70/15 |
| 2016/0090754 A1* | 3/2016 | Mohamed | B62H 5/147 70/15 |
| 2018/0350175 A1* | 12/2018 | Fan | G07C 9/00182 |

FOREIGN PATENT DOCUMENTS

| | | | | |
|---|---|---|---|---|
| DE | 102011004464 A1 * | 8/2012 | | B62H 5/147 |
| DE | 202012009617 U1 | 2/2013 | | |
| EP | 1057720 A2 | 12/2000 | | |
| EP | 1818246 A2 | 8/2007 | | |
| EP | 2357124 A2 | 8/2011 | | |
| EP | 2437222 A1 | 4/2012 | | |
| EP | 3170723 A1 * | 5/2017 | | B62H 5/14 |
| WO | WO 2011/101116 A1 | 8/2011 | | |
| WO | WO 2014/044111 A1 | 3/2014 | | |

OTHER PUBLICATIONS

Jojaqs: "Jojaqs Crowd Sourced Funding Example (Kickstarter and Indie-gogo) Loopock." YouTube; Sep. 10, 2014; https://www.youtube.com/watch?v=MSTdBx3SS-o; Date Retrieved Jun. 6, 2016.

LOCK8.; "Lock8—The World's First Smart Bike Lock." https://www.kickstarter.com/projects/lock8/lock8-the-worlds-first-smart-bike-lock/description ; Date Retrieved Jun. 15, 2016.

McGraw.; "Crowdfunding Combat: Bitlock vs. Lock8 Smart Bike Locks." Autoblog; Oct. 29, 2013; https://www.autoblog.com/2013/10/29/crowdfunding-combat-bitlock-vs-lock8-smart-bike-locks/; Date Retrieved Jul. 6, 2016.

Puhala.; "Behold the World's First Keyless, Foldable, App-Connected Bike!" Britco; Apr. 4, 2014; https://www.brit.co/fabio-the-robot-is-a-worse-employee-than-youll-ever-be/ ; Date Retrieved Apr. 4, 2014; 7 Pages.

Thijs.; "6 Smart Keyless Bike Locks." Hobbr.com; Dec. 23, 2014; http://www.hobbr.com/6-smart-keyless-bike-locks/; Date Retrieved Dec. 23, 2014; 7 Pages.

* cited by examiner

Fig. 10
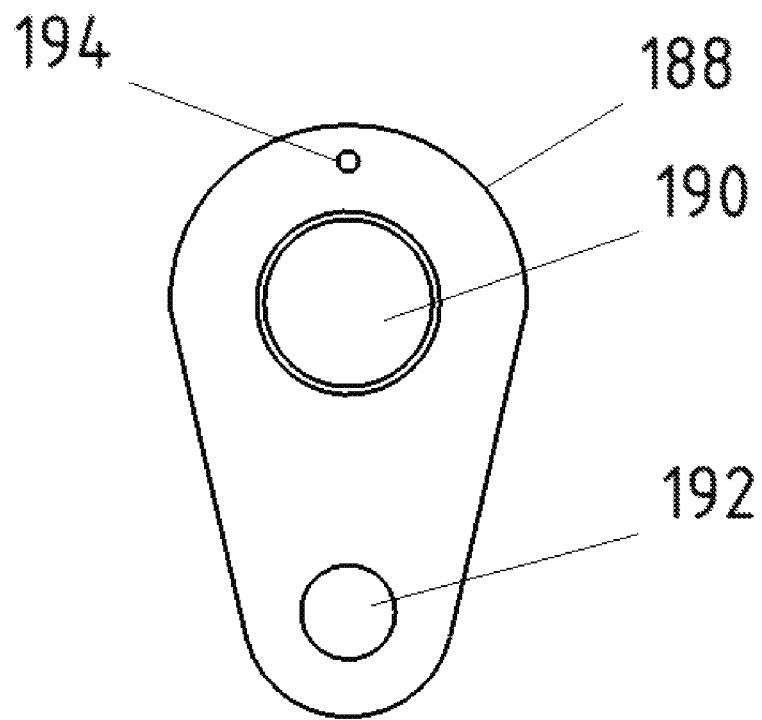
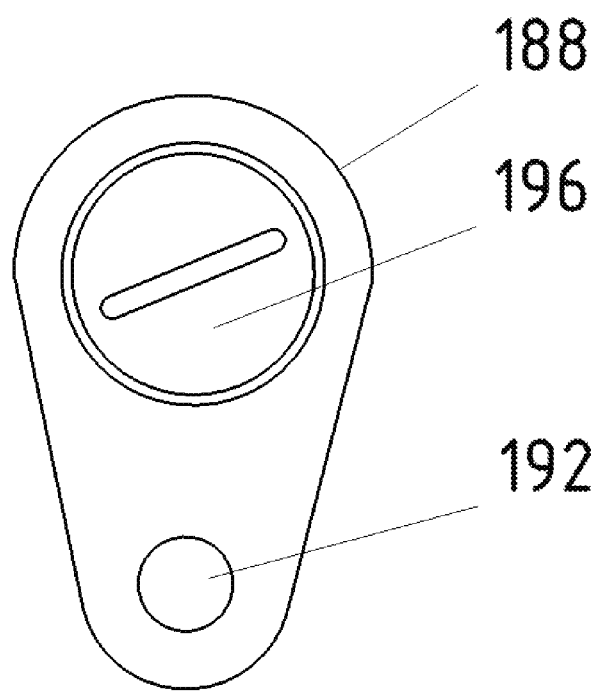

ANTI-THEFT LOCK FOR TWO-WHEEL VEHICLES

TECHNICAL FIELD

The invention relates to an anti-theft lock for bicycles and other vehicles driven by humans, which is adapted to switch from a locked state to a move state, comprising:
(a) means for tamper-proof attachment of the anti-theft lock at the vehicle;
(b) a control unit for switching the anti-theft lock from a locking state to a move state and vice versa.

An anti-theft lock is used to switch off a function of a vehicle which is essential for the vehicle operation or block the vehicle operation. A typical example of such an anti-theft lock is a frame lock. With bicycles driven with electric power, however, it is also possible to block the activation of the motor drive, whereby the vehicle operation is restricted by the motor resistance.

Bicycles and other vehicles which are driven by humans are more and more used in urban areas for everyday affairs. A still remaining problem is the protection of the vehicle against theft. Securely fixed frame locks have proved to be efficient in addition to cable locks, U-locks or foldable locks.

The term "bicycle" is understood to mean single lane vehicles which may be driven either by manpower or with a motor. It includes bicycles with a stabilizer wheel or an additional wheel. Such vehicles are, for example, cargo bicycles, E-bikes, pedelecs, S-pedelecs, tricycles, trainer bikes, scooters, bicycles and the like. Not comprised are motor vehicles such as, for example, cars or trucks, where the power is generated not by a human person but exclusively by a motor.

PRIOR ART

Known frame locks block the rotational movement of one of the wheels with a mechanical locking bracket. Thereby, an unauthorized use of the vehicle is made difficult or prevented. There are frame locks known which are provided with an engine-driven locking bracket. EP 2357124 A2, for example, shows an electro-mechanically driven anti-theft lock.

It is the case with manually operated frame locks that it is necessary to manually lock or unlock the mechanism. Even electronically controlled frame locks must be unlocked with an electronic key. Such an electronic key can be a remote control or a mobile phone. It is complex and time consuming, especially for very short business, to lock the bicycle with several operating steps and unlock it again. Accordingly, known embodiments of a frame lock do not contribute to the comfort of the user.

Contrary to motor driven vehicles, the vehicles driven by humans and in particular with bicycles, there is no motor forming a natural anti-theft lock if it is not activated. With such vehicles, there will always be an additional lock or the like required which must be individually switched to a locking state.

DISCLOSURE OF THE INVENTION

It is an object of the invention to more quickly and more comfortably protect a vehicle of the above mentioned kind against theft.

According to the present invention, this object is achieved in that (c) the control unit is provided with a receiver for receiving wireless transmitted signals from a corresponding mobile transmitter, and with means for determining the distance to the mobile transmitter;
(d) the control unit switches the anti-theft lock to a locking state if the distance exceeds a threshold and the vehicle does not move at the time; and
(e) the control unit switches the anti-theft lock to a move state if the distance is less than a threshold.

With the solution according to the present invention one unit is tightly integrated in the anti-theft lock while the second unit can be used independently and mobile. The units are suitable to determine the distance between the user with the mobile transmitter and the vehicle with the control unit. The anti-theft lock is controlled in dependency thereof.

Preferably, the anti-theft lock comprises a lock adapted to be fixed to the vehicle which is provided with a blocking device for blocking the rotation of a wheel. In particular, it can be provided that the blocking device is driven and a wheel is blocked or unblocked, respectively. The solution according to the present invention has the advantage that protecting the vehicle against theft is possible without any user action by the user. Due to the solution according to the present invention the protection against theft of the bicycle cannot be forgotten. The invention simplifies the protection against theft in particular when there is not time for the use of a key in classic manner or for the operation of the lock or when there are other obstacles. Also, there is no risk of contacting dirty parts of the vehicle as is the case with a classic frame lock with mechanical operation.

In a further modification of the invention, a motor controlled by the control unit for driving the blocking device is provided. In this case, the motor is activated for blocking. It is, however, also possible to block the motor of an auxiliary driving unit. The motor break will then prevent that the vehicle can be used. Instead of a wheel other components, such as the handle bar or the pedals or the like can be blocked.

Preferably, it is provided that the blocking device is a curved locking bracket, adapted to be moved into the range between the spokes of a wheel for locking. The locking bracket may be provided therein with a geared angular range for engaging a gear wheel driven by a motor.

A further modification of the invention provides that the control unit and the mobile transmitter comprise bidirectional communication between the transmitter and receiver units and the distance is determined from the signal strength of a signal exchanged between the control unit and the mobile transmitter.

In particular, the receiver in the control unit may be adapted to receive and process the signals of a smart phone, a tablet computer or any other mobile end device. For example, the user has a mobile transmitter, a mobile phone or a smart phone which can contact the radio unit of the control unit at the anti-theft lock by a radio connection. Then, the control unit can determine the emitting and receiving strength of the signal by a measuring method. The measuring result can be used to determine the distance between the control unit at the vehicle and the mobile transmitter at the user. A control circuit unlocks or locks the vehicle depending on the distance between the mobile radio unit and the radio unit at the anti-theft lock.

In a preferred modification the radio connection is established by Bluetooth technology or a comparable RF technology. A compatible end device or a mobile transmitter serves as a digital key. Contrary to known assemblies and keys for cars, the unlocking and locking is carried out "automatically" without any action from the user. Only the distance and the moving state of the vehicle is considered. A moving vehicle is not locked at any time.

The use of a coded transmission of the signals as an additional feature provides protection against unauthorized access or tampering. For example, a first device can provide an exclusive access by the combination of a single digital key (such as, for example, an identification code) with a mobile transmitter. The exchanged code is permanently stored in a storage of the control unit and compared by the mobile transmitter with the storage content after coded transmission. The release of the control switching the states will result from a positive comparison.

In a further advantageous embodiment the anti-theft lock can be individually configured by the user by means of a smartphone application. The sensitivity of the sensor system described below, the distance for the locking and/or unlocking procedure, the energy state of one of the energy supplies described below and further states can be indicated and configured. Also, a digital key for the anti-theft lock can be forwarded to another user. This enables the renting of the vehicle without the need to hand over a key in person.

The anti-theft lock can comprise a sensor to determine the rotational speed of a vehicle wheel. From the rotational speed it can be derived if the vehicle is moving or not. The anti-theft lock will not lock a moving vehicle. In such a way it is ensured that the loss of the mobile transmitter during the ride will not cause an unwanted and potentially dangerous locking.

Alternatively or additionally, the anti-theft lock may comprise a tilt and/or acceleration sensor. With such sensors it can be, for example, determined if the locked vehicle is lifted or moved in any other way. Such a movement can be related to theft which is indicated by an acoustical and/or optical warning signal. Such a movement can be notified to the transmitter, such as a mobile end device, by the control unit whereby the user is enabled to take suitable measures. The sensor can additionally be used for the detection of the moving state. Thereby, two independent sensor systems are available for this task. Thereby, redundancy is achieved.

Preferably, the anti-theft lock is provided with an accumulator adapted to be recharged by the vehicle movement or a battery cell for providing the control unit and/or the sensors with electrical energy. Ordinary batteries, solar cells or any other rechargeable accumulators may, however, also be provided. It is also possible to use the energy supply provided for a vehicle with an electric auxiliary power. The energy supply is ensured by an accumulator integrated in the housing. The energy system of, for example an E-bike or a hub dynamo or the lighting dynamo of a bicycle, then serves to feed the integrated accumulator. The charging electronics ensure the continuous availability of the integrated accumulator and controls the charging processes. An interface is provided for the emergency supply, which enables the re-charging with an external power supply or another external energy source (for example Smartphone, emergency accumulator pack, solar module, etc.).

Preferably, two electroconductive and marked contact points are provided at an accessible outside of the housing. If a commercially available 9 V-battery block is contacted to such contact points with correct polarization an emergency supply is possible at all times if the internal battery is empty.

In a particularly preferred embodiment of the invention sensors are provided for detecting untypical states and optical and/or acoustic means for generating a warning signal upon the occurrence of an untypical state. Such an untypical state is the movement of the vehicle which can suggest theft. Different states, however, may also be recorded, such as weight, temperature or the like.

Preferably, the anti-theft lock is provided with a closed impact resistant outer housing which has attachment points for screwing to the bicycle frame. An inner frame made of steel plate accommodates the driving mechanics and protects various components of the lock against tampering.

In a further advantageous embodiment the anti-theft lock is provided with different attachment points in order to enable the fixing at receiving points at bicycle frames with different positions and distances.

Preferably the anti-theft lock is provided with a sensor system in the form of an acceleration or tilt detector and a wheel rotation sensor. The evaluation of the signals by a control algorithm enables the recognition of riding operation and prevents a locking procedure during riding.

In a further preferred embodiment the detection of the charging voltage or the signal processing of the E-bike power system enables the detection of the bike movement.

In a preferred embodiment the anti-theft lock is provided with an acoustic theft warning alarm. A sound converter generates a warning signal upon tilting or shaking of the bicycle and upon cutting open of the blocking device. The transmission of a notification of an attempted theft to the mobile radio unit or a smartphone is advantageous. Thereby, the bicycle owner is warned.

In a preferred embodiment the blocking device is a curved locking bracket which is geared at the outside which can be moved by a driving unit. The driving is generated by an engaged geared wheel, which in turn is driven by an electro motor. With such driving mechanics the locking bracket can be moved to an opening or a locking position.

Preferably, the locking bracket is secured by an additional locking element in the form of a lifting solenoid bolt each in the opening and in the locked position. Thereby, it is possible to reliably prevent a movement of the locking bracket against the assumed end position. The lifting solenoid bolt is spring-biased and engages in bore holes provided in the side of the locking bracket. The un-locking procedure is initiated by an associated control which pulls the lifting solenoid bolt out of the bore hole against the spring power depending on the control logic and releases the driving motor of the locking bracket. Upon reaching the next end position the lifting solenoid bolt again secures all by itself.

In a further advantageous embodiment the locking bracket is held in its position by a cam-driven, spring-biased latch which engages in a recess in the locking bracket in the opening and locking position.

Preferably, the guiding of the locking bracket at the rotating inner circle is formed by friction reduced guiding rolls which are accommodated by the distance bolts at the inner housing frame. Also, the guiding of the locking bracket is secured in the plane of the rotational axis by inner guiding webs of the outer housing. The movement of the locking bracket at the driven circumference is ensured with low friction by a driving geared wheel and a guiding geared wheel. With the design of the locking bracket according to the invention a long-living and low-friction movement of the locking bracket can be achieved by using few, inexpensively manufactured components.

Preferably, the rotation of the locking bracket is limited by an end stop. The end stop can be limited, for example, in the form of a pin which sits in a bore hole at the circumference of the locking bracket. The locking bracket is provided with an end stop each for the opening and locking position. The end stop is generated by the limitation of the rotational path upon abutting the respective end stop pin at a distance bolt of the inner housing frame.

In a further advantageous design the anti-theft lock is provided with an additional locking mechanism for a steel cable or a steel chain. The two wheeled vehicle can than be locked to the environment, such as a bicycle stand or a fence, by means of a steel cable or a steel chain. This addition increases the theft protection and enables the locking of further components of the vehicle.

The invention is particularly advantageous with bicycles which are driven by manpower and are, therefore, not blocked by a switched-off motor.

Further modifications of the invention are subject matter of the subclaims. Embodiments are described below in greater detail with reference to the accompanying drawings.

BRIEF DESCRIPTION OF THE DRAWINGS

FIG. 10 shows a mobile unit in the form of a key hanger which is suitable to control the opening and locking procedure of the anti-theft lock in dependence of the distance as an alternative to a smart phone or tablet computer according to FIG. 9.

DESCRIPTION OF THE EMBODIMENTS

Figure 1:
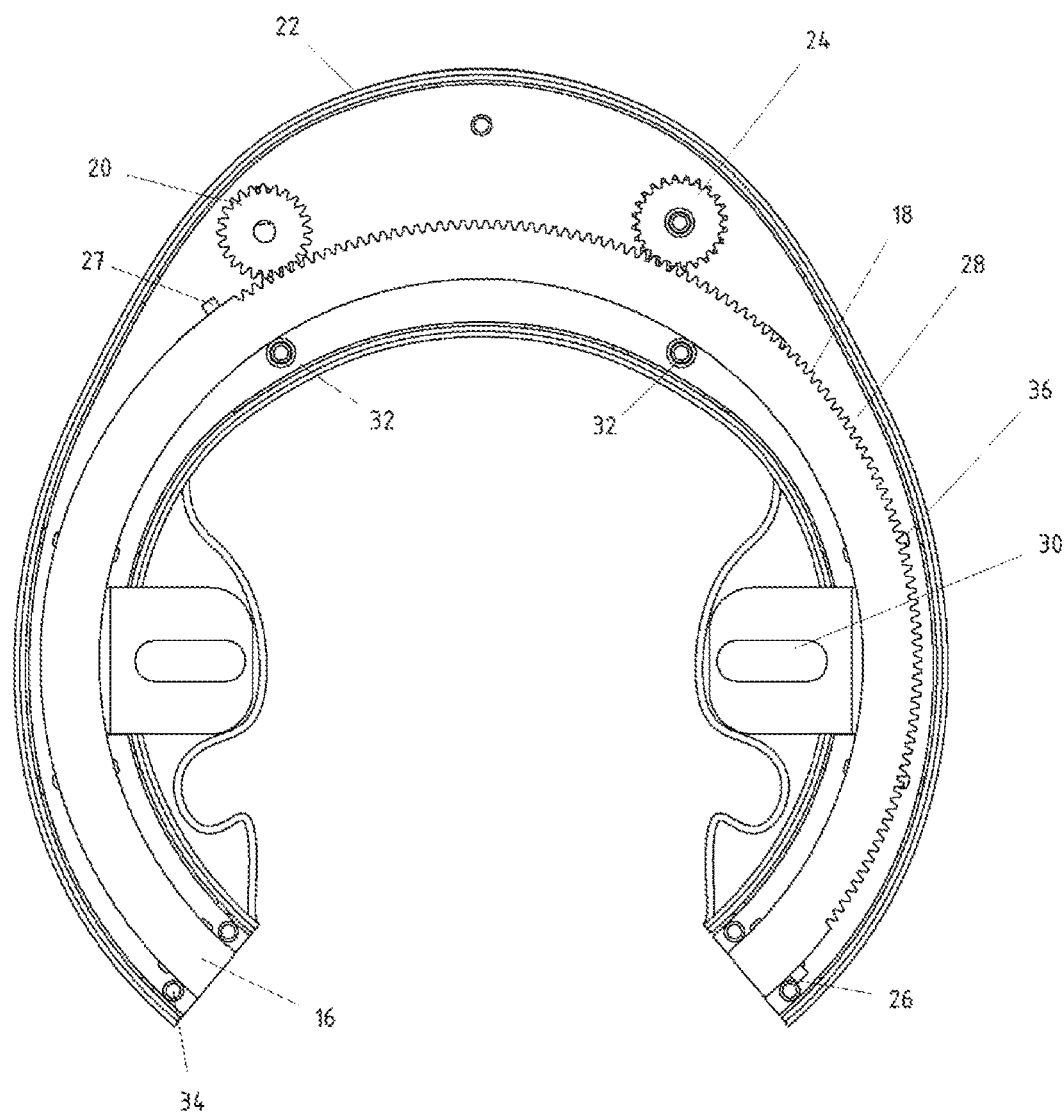
FIG. 1 represents a cross section in the rotational plane of a locking bracket of an anti-theft lock in the form of a frame lock in its opening position.
Figure 6:
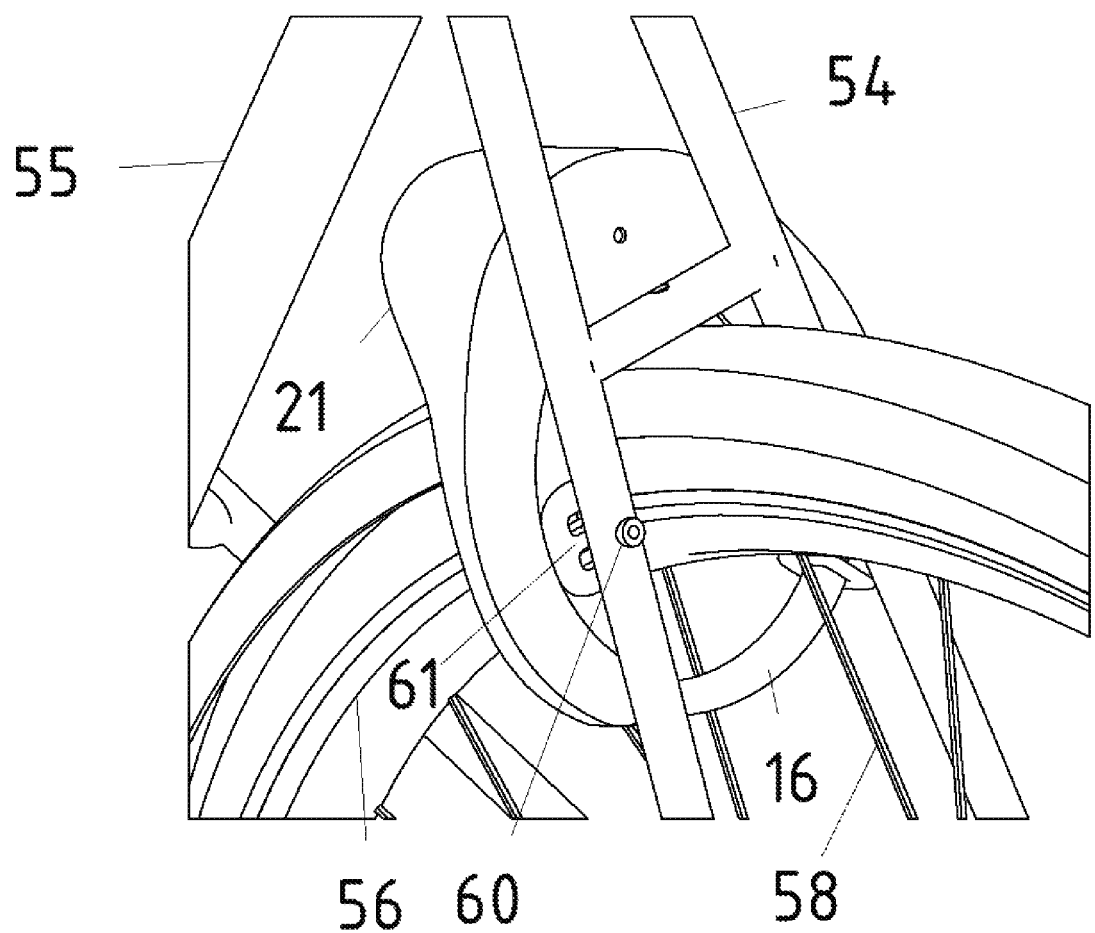
FIG. 6 illustrates the mounting of the anti-theft lock in the form of a frame lock at a common bicycle frame.

FIG. 1 shows an anti-theft lock in the form of a frame lock for bicycles or other two-wheeled vehicles. The frame lock 21 is, as shown in FIG. 6, tightly fixed to the frame 55 of a bicycle. A locking bracket 16 provided at the frame lock 21 is moved in between the spokes of a wheel 56 for locking purposes and thereby blocks the rotation of the wheel 56. The locking bracket 16 is provided with a curvature 17 in order to improve the guiding in the locked position shown in FIG. 2. A housing 22 receives the mechanical and electronical components. An inner plate frame 28 is connected to the housing 22 and is screwed together by distance bolts 34 with a second frame 31 and fixed in a spaced-apart manner.

Two mounting recesses 30 enable the installation at a bicycle frame 55 which is provided with threaded bore holes 60 for receiving commercially available frame locks. Two gear wheels 20 and 24, several radially extending guiding webs 36, two guiding rolls 32, and distance bolts 34 serve as guiding for the locking bracket 16. Two guiding rolls 32 serve as low-friction bearings of the locking bracket 16. The gear wheel 20 also has the task to drive the locking bracket 16. A gearing 18 at the circumference of the locking bracket 16 enables the transmission of the driving powers of the driving motor 42 and the conversion to a rotational movement of the locking bracket 16. A pin 26 in the opening and a pin 27 in the locking position forms the end stop by blocking against a distance bolt 34.

Figure 2:
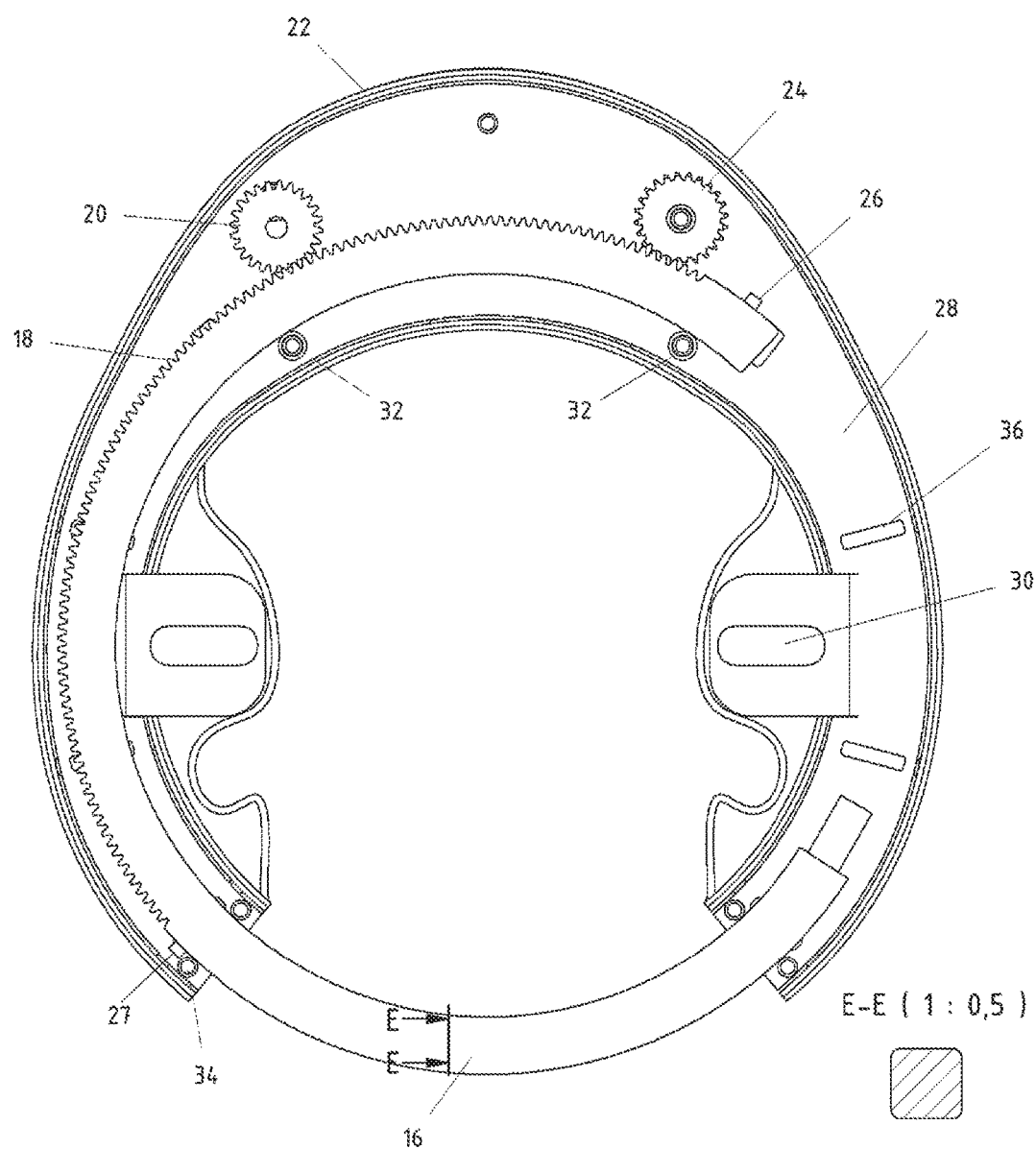
FIG. 2 shows the locking bracket of FIG. 1 in the locked position.

FIG. 1 shows the locking bracket 16 in an open position. In this case, the wheel is not blocked. FIG. 2 shows the same components as FIG. 1. In FIG. 2 the locking bracket 16 can be seen in the locking position.

Figure 3:
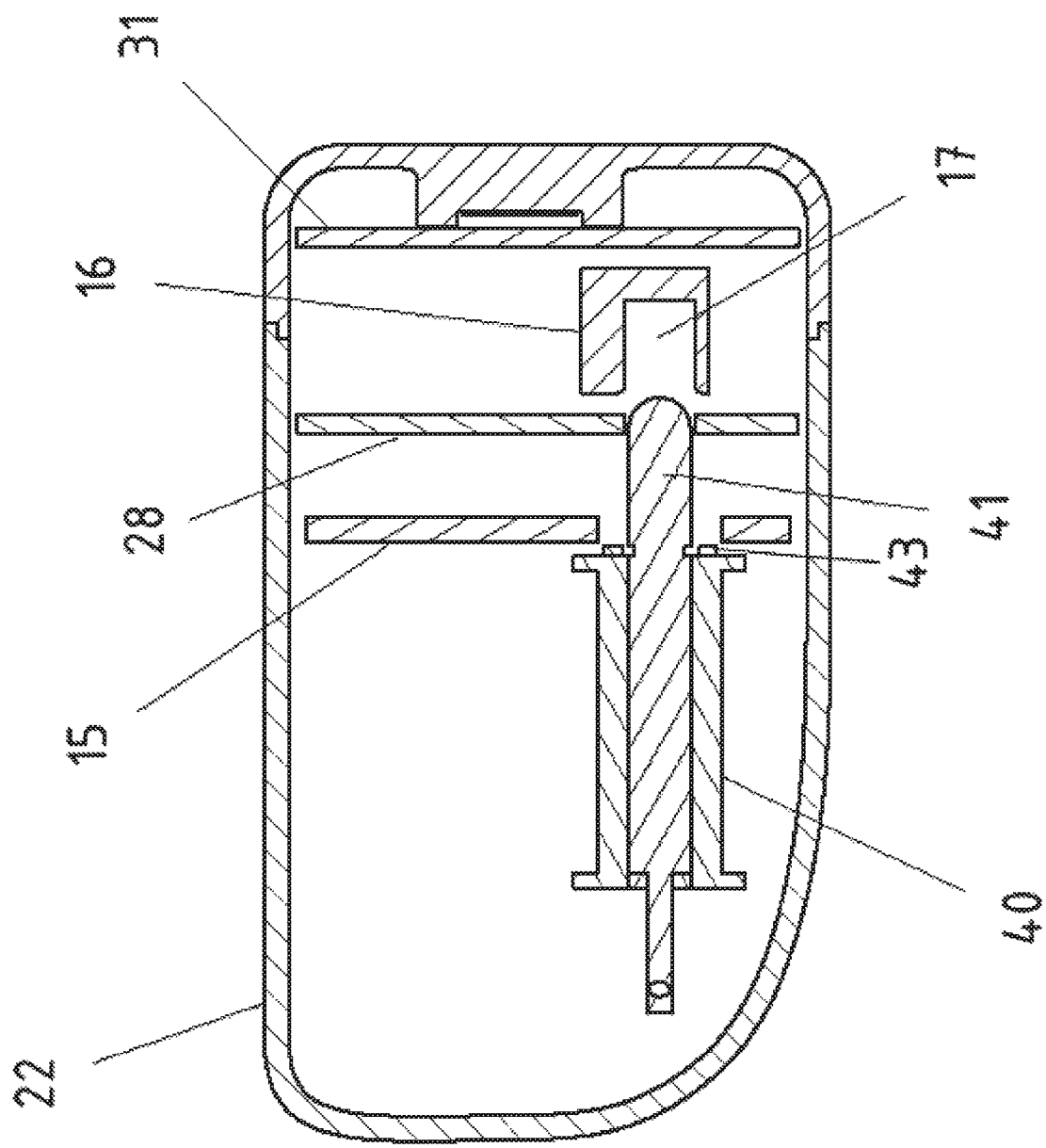
FIG. 3 is a cross section of the assembly of FIG. 1 perpendicular to the rotational plane of the locking bracket.

The blocking device of the locking bracket 16 by means of a lifting magnet 40 and a lifting magnet bolt 41 can be seen in FIG. 3. It is understood that the term "blocking" means the state where it is important that the locking bracket is secured in its position. Upon locking the blockage of the wheel by the locking bracket is predominant. The locking bracket 16 is provided with two recesses 17 and 19. The recess 17 is provided for blocking the locking bracket 16 in the open position. The recess 19 is provided for blocking the locking bracket 16 in the locked position as shown in FIG. 2. The lifting magnet bolt 41 is biased by a spring 43 and automatically locks in one of the recesses 17 or 19, respectively, as soon as the locking bracket 16 reaches one of the end positions. The lifting magnet 40 is screwed to the housing 22 and guided by the plate frame 28 on the side of the motor. The printed circuit board 15 is provided behind the plate frames 31 and 30.

Figure 4:
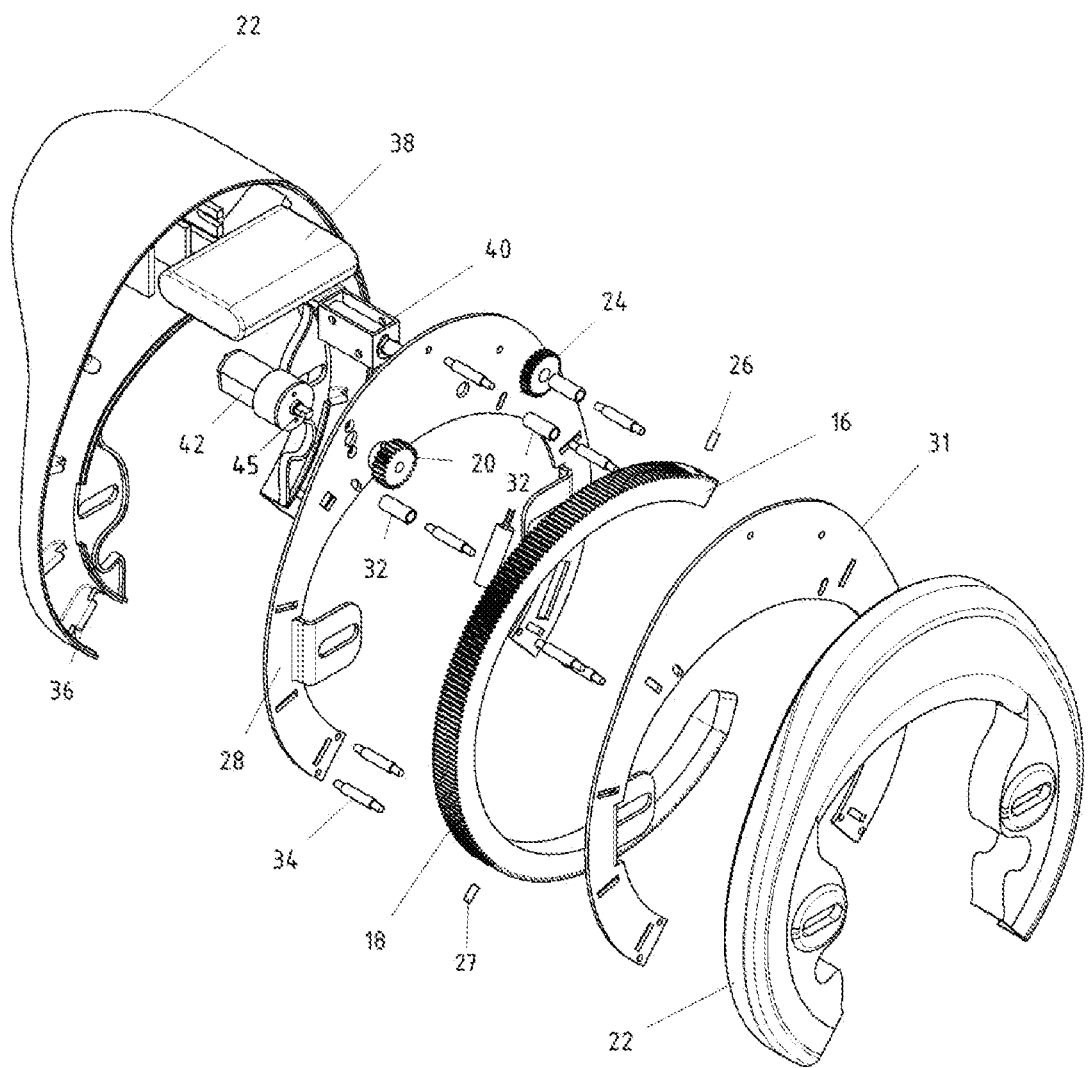
FIG. 4 shows an exploded view of the components of the assembly of FIG. 1.

FIG. 4 shows a housing 22 which receives an energy carrier, such as an accumulator 38 or a battery and the lifting magnet 40. A motor 42 is tightly screwed to the motor-side plate frame 28. The driving wheel is positively connected to the driving shaft 45 of the driving motor 42. The locking bracket 16 is positioned and guided by the gear wheel 24 in such a way that the driving wheel 20 engages in the gearing 18 and transfers the driving forces. The housing 22 accommodates one plate frame 28 and 31, respectively, by means of the guiding webs 36. The thus generated composite of the housing 22, plate frame 28 and 31, respectively, and the guiding rolls 32 guide the locking bracket 16 during the movement to the open or locked position. The open or locked position is limited by the end stops 26.

Figure 5:
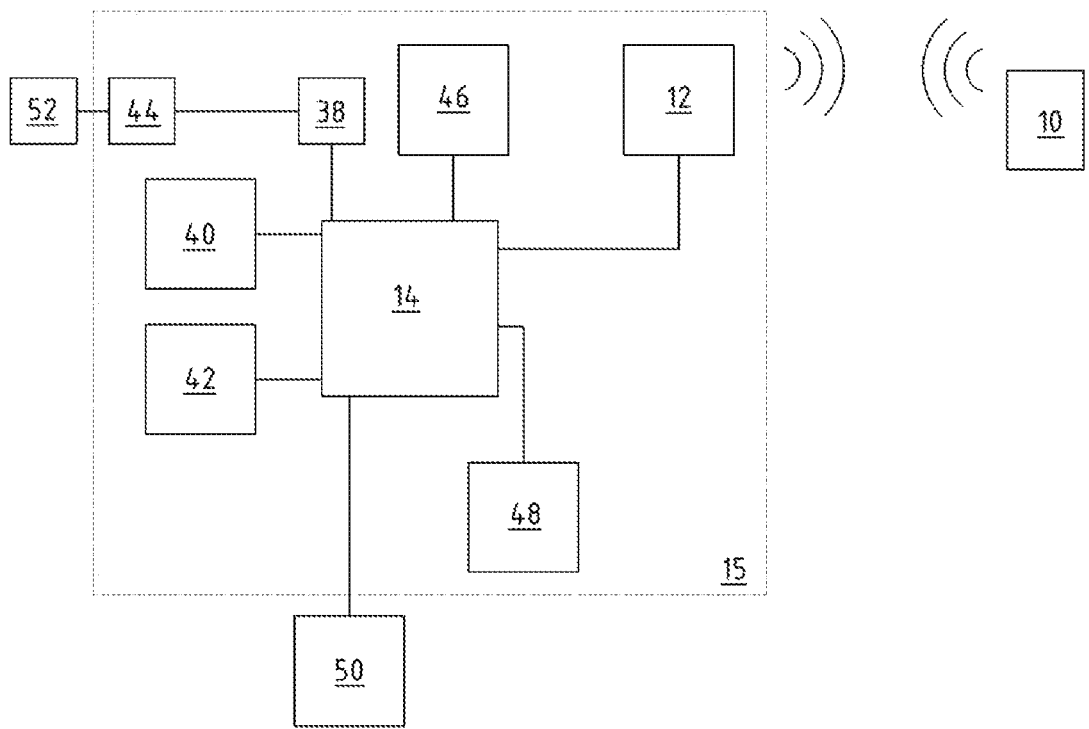
FIG. 5 shows the design of the control electronics by means of a block diagram.

A block diagram shown in FIG. 5 shows the control of the locking and opening procedure of the frame lock 21. In addition to the frame lock 21, a mobile radio unit 10, a detection unit for the wheel rotation 50 and a board network 52 is shown. The components of the control unit described below are present inside the housing 22 on a printed circuit board 15. A central control unit 14 serves to accommodate, process and output electric signals of the connected components which are shown in FIG. 5. A bidirectional Bluetooth radio unit 12 which is tightly integrated in the frame lock 21 is connected to a mobile bidirectional Bluetooth radio unit 10 by means of a Bluetooth radio connection. The mobile, bidirectional Bluetooth radio unit 10 can be a smartphone, a tablet or a transponder. Depending on the distance of the mobile radio unit 10 and the frame lock 21 the central control unit 14 activates the driving motor 42 and the lifting magnet 40. If, for example, the distance between the mobile radio unit and the frame lock 21 is larger than 2 meters a locking procedure is initiated. If the distance of the mobile radio unit to the frame lock 21 is smaller than, for example, 2 meters the opening is initiated. The user may individually configure the distances (thresholds) for a locking or opening procedure. A hysteresis between the thresholds prevents continuous changing between locking and opening procedures upon variations of the measuring values.

The accumulator 44 supplies the entire control unit shown in FIG. 5 and is controlled by a charging electronics. The latter charges the accumulator 38 from the board network 52 of the bicycle if required. A signal generator generates an acoustical alarm signal for discouraging attempted thefts and provides acoustical notices about the state of the lock. Such states are, for example, "low charging state of the accumulator", "locking procedure could not be finished", "successful authentication of a user", etc.

A tilt and acceleration sensor 48 recognizes movements of the bicycle and transmits such information to the central control unit 14. An algorithm processes the signals and controls the signal generator 46 upon recognition of an attempted theft or transmits a notice to the mobile radio unit 10 of the user.

In FIG. 6 the frame lock 21 described above is mounted at the bicycle. The threaded holes 60 commonly provided at the bicycle frame for accommodating accessories are used as fixing points for the frame lock 21. The frame lock 21 is connected to the provided mounting accommodations 61 with fixing points 60 at the frame webs 54 of the bicycle frame 54 by means of two screws (not shown). At least two mounting accommodations 61 at different positions enable the fixing of the frame lock 21 at different accommodation points 60 of the bicycle frame 55. The locking bracket 16 is in the locking position between the wheel spokes 58 and prevents the rotation of the wheel 56.

Figure 7:
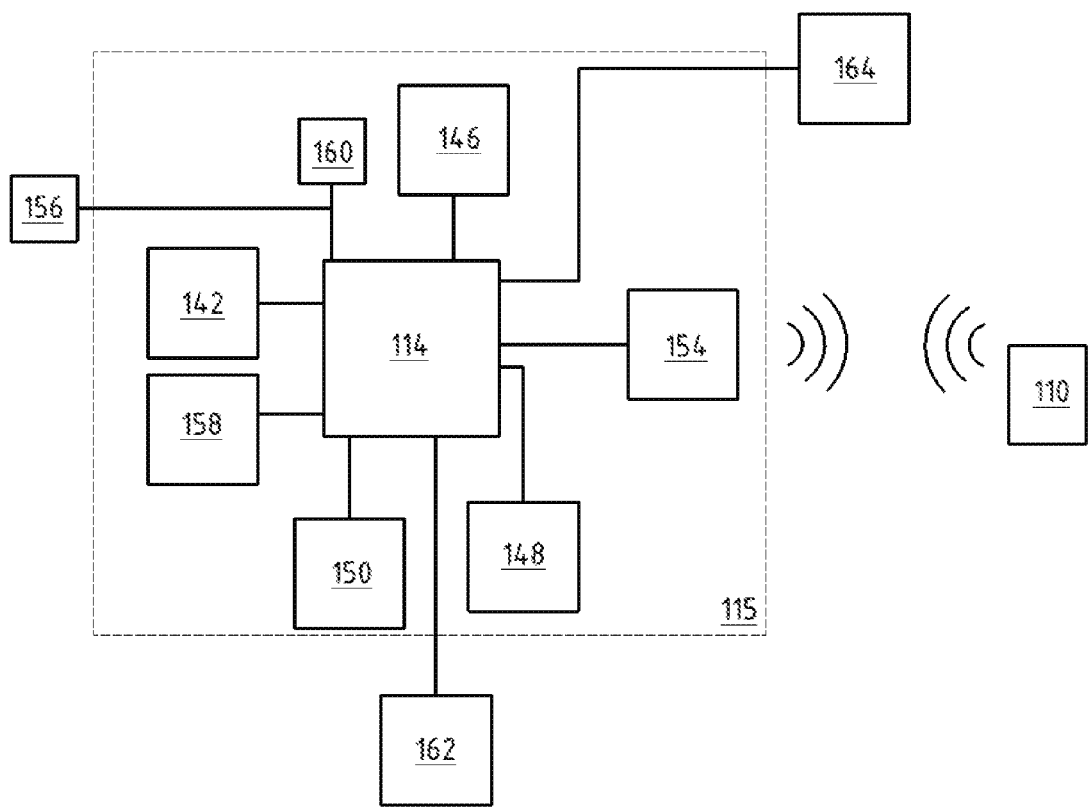
FIG. 7 shows an alternative embodiment of the control electronics using a block diagram.

FIG. 7 shows a block diagram for an alternative embodiment. The assembly is similar to the one shown in FIG. 5 with the following differences: the radio unit 12 and the central control unit 14 are integrated together in a micro controller unit 114. It is a Bluetooth chip with antenna configuration 154. The detection unit for the wheel rotation 150 in the form of an optical transmitter and receiver is provided on a printed circuit board 115 and can recognize wheel spokes 58 in the moving path of the locking bolt. An electronic end position recognition 158 enables the position recognition of the locking bracket 16 in the open and locking position by means of an electric contact loop. A non-rechargeable lithium battery cell 160 is used for the energy supply. If the battery cell 160 is discharged an emergency supply can be established through a two-pole contact point 156 by means of a 9 V battery block. The locking of the locking bolt 16 in the open and locking positions is effected without a second actor. A capacitive sensor key 162 forms the operating interface at the frame lock. It can be used, for example, for inserting an unlocking code which can be individually configured. A multi-color light emitting diode 164 serves to indicate operating states of the frame lock.

Figure 8:
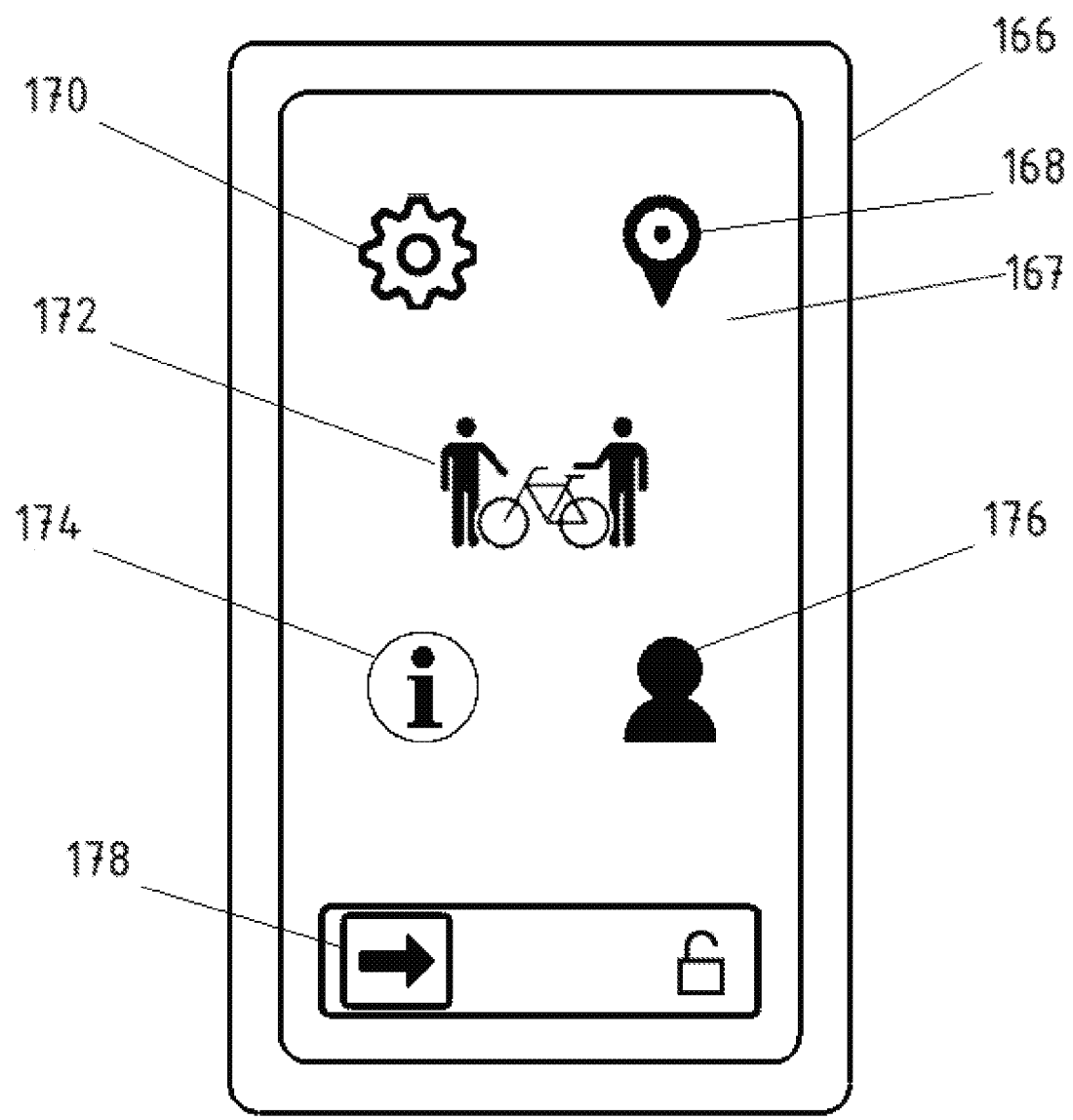
FIG. 8 shows a smart phone with a mobile application for a user menu for the user.
Figure 9:
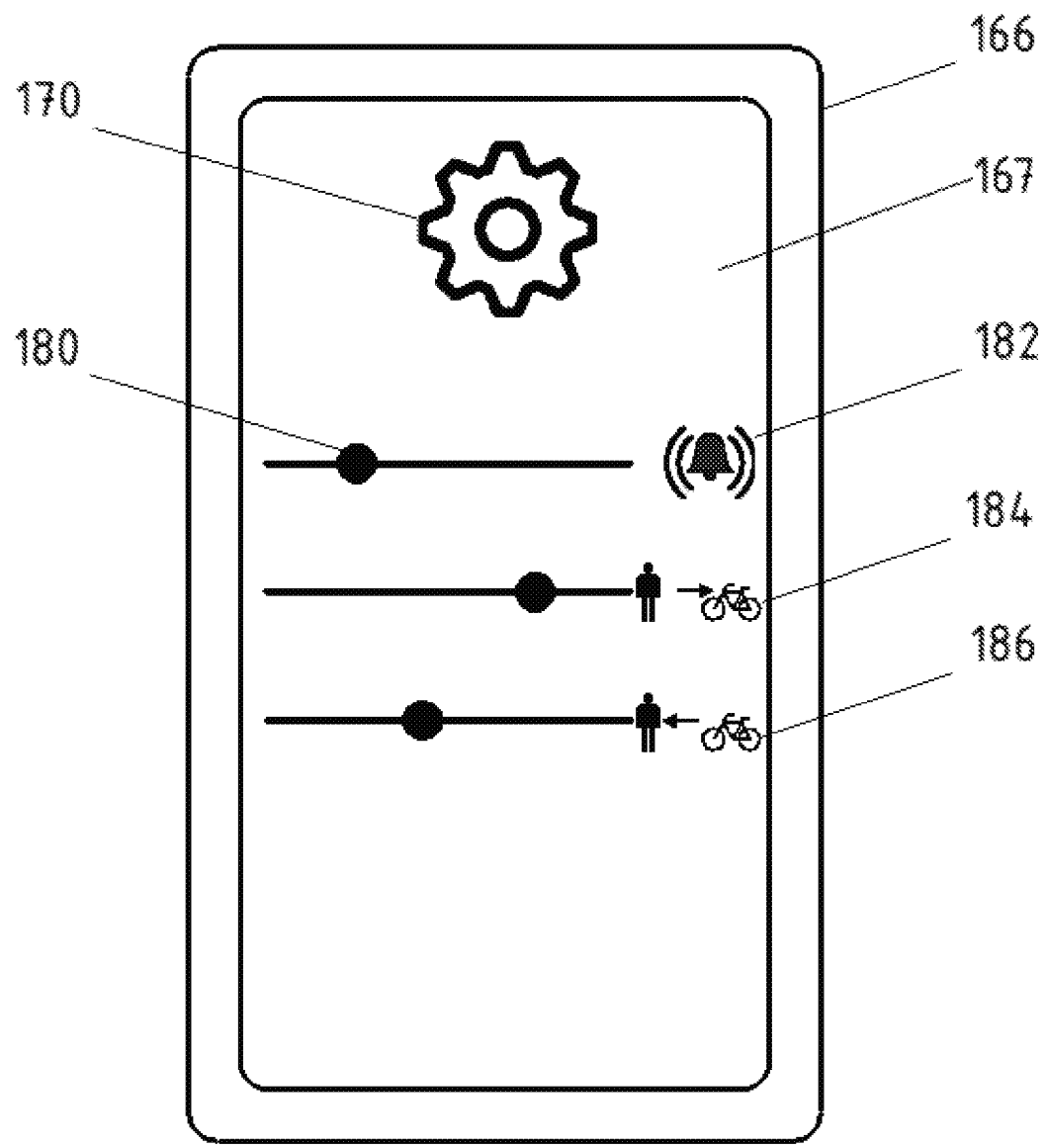
FIG. 9 shows a smart phone with a mobile application for a configuration menu for the user.

FIG. 8 shows a mobile end device 166 which shows an operating menu for the frame lock 21 on the display 167 by means of a software. The represented symbols lead to a sub-menu with the corresponding options upon selection. A geared wheel symbol 170 leads to the menu settings. This is shown in FIG. 9. A location symbol 168 leads to the determination of the position or the representation of the position of the frame lock 21. A renting symbol 172 leads to a sub-menu which allows the sharing of the digital key with further users. An information symbol 174 leads to a sub-menu, which represents status information of the frame lock 21. For example, the charging state of the battery, the connection status, the user recognition identification of the anti-theft lock, failure notice and further statistic and functional data. A user symbol 176 leads to the administration of the user account. The frame lock 21 can be manually opened and closed by radio command with a digital scroll bar 178. A mobile end device can be a smartphone, tablet or any other similar device.

FIG. 9 shows a mobile end device 166 which represents a configuration menu for the frame lock 21 on the display 167 by means of a software. Several digital scroll bars 180 enable the individual adaptation of various functional parameters. A scroll bar with an alarm symbol 182 enables the activation and deactivation, respectively, and the selection of the sensitivity of the alarm function of the frame lock 21. A scroll bar with a distance symbol user direction bicycle 184 enables the activation and deactivation, respectively, and the selection of the distance of the distance-dependent opening function of the frame lock 21. A scroll bar with a distance symbol user counter-direction bicycle 186 enables the activation and deactivation, respectively, and the selection of the distance of the distance-dependent locking function of the frame lock 21.

FIG. 10 shows a transponder in the form of a keyring pendant 188. The keyring pendant is suitable for controlling the distance-dependent locking and opening of the frame lock 21 and can be used as an alternative to a smartphone, a tablet or any other similar mobile end device. The keyring pendant does not have the possibility to individually configure the frame lock 21, but exclusively enables the use of the core function of the distance dependent locking and opening as well as the transmission of status notices, such as theft warnings, the state of the energy cell and the connection status. The keyring pendant 188 is provided with a passage 192 which is suitable for fixing to a keyring or a bracelet (not shown).

A touch key 190 is suitable to manually open and lock the anti-theft lock by pressing the key by means of a radio signal. A light emitting diode 194 enables the user to recognize operating states, such as, for example, a critical battery state, a theft alarm or further function notices. A battery slot 196 enables the exchange of the battery cells on the inside.

Figure 11:
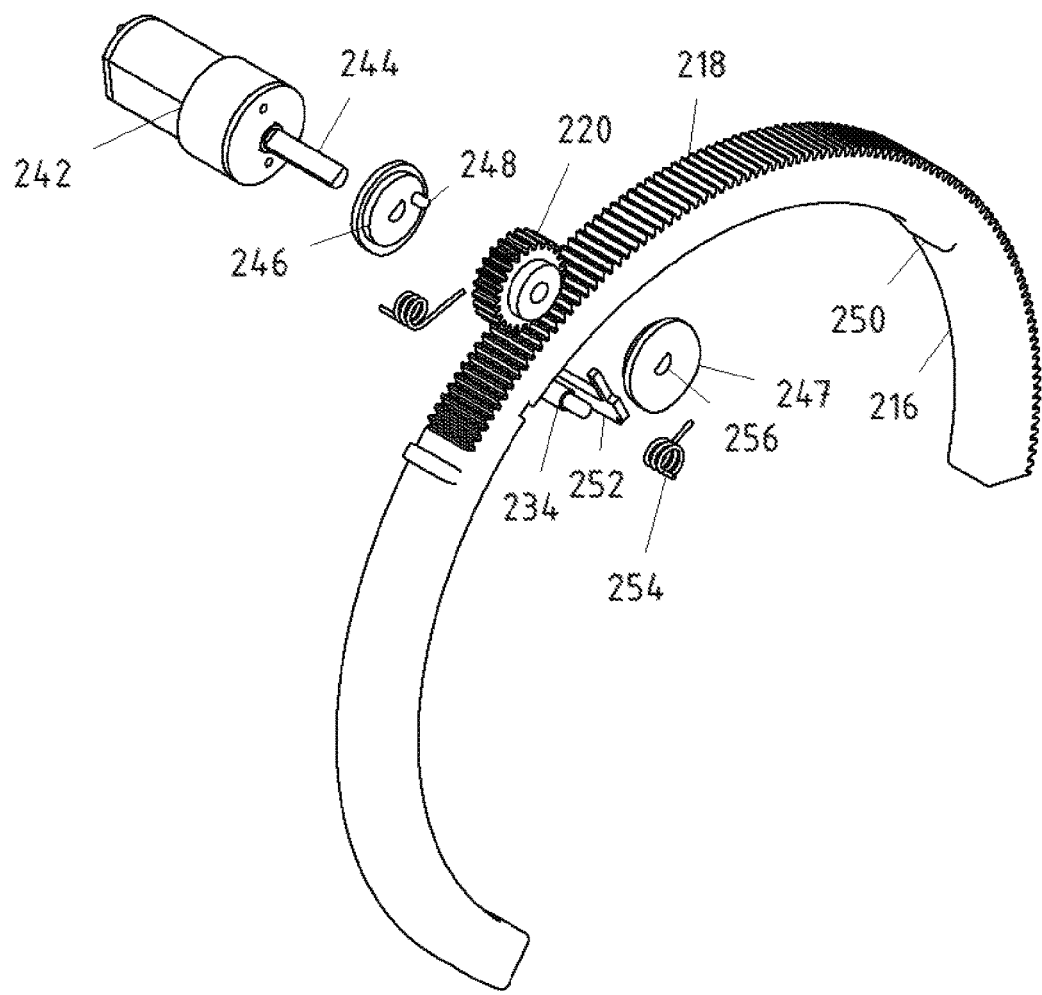
FIG. 11 is an exploded view of a locking device of a locking bracket for bicycles which are locked with a spring-biased latch according to a second embodiment.

FIG. 11 shows an alternative locking device of a locking bracket 216 by means of a spring-biased latch 252. The driving motor 242 is provided with an offset semi-circular driving shaft 244. The driving shaft 244 positively accommodates the two unlocking cams 246 and 247 by the geometrically designed shaft bearings 256 and freely moving the driving wheel 220. The unlocking cams 246 are provided with a cam pin 248. The geared wheel 220 positively and form fittingly rolls of the locking bracket 216 which is provided with a toothing 218. A double leg spring or two leg springs 254 are held on a distance bolt 234 and their movement is guided. The latch 252 can be spring-biased and engage in the recesses 250 of the locking bracket 216.

Figure 12:
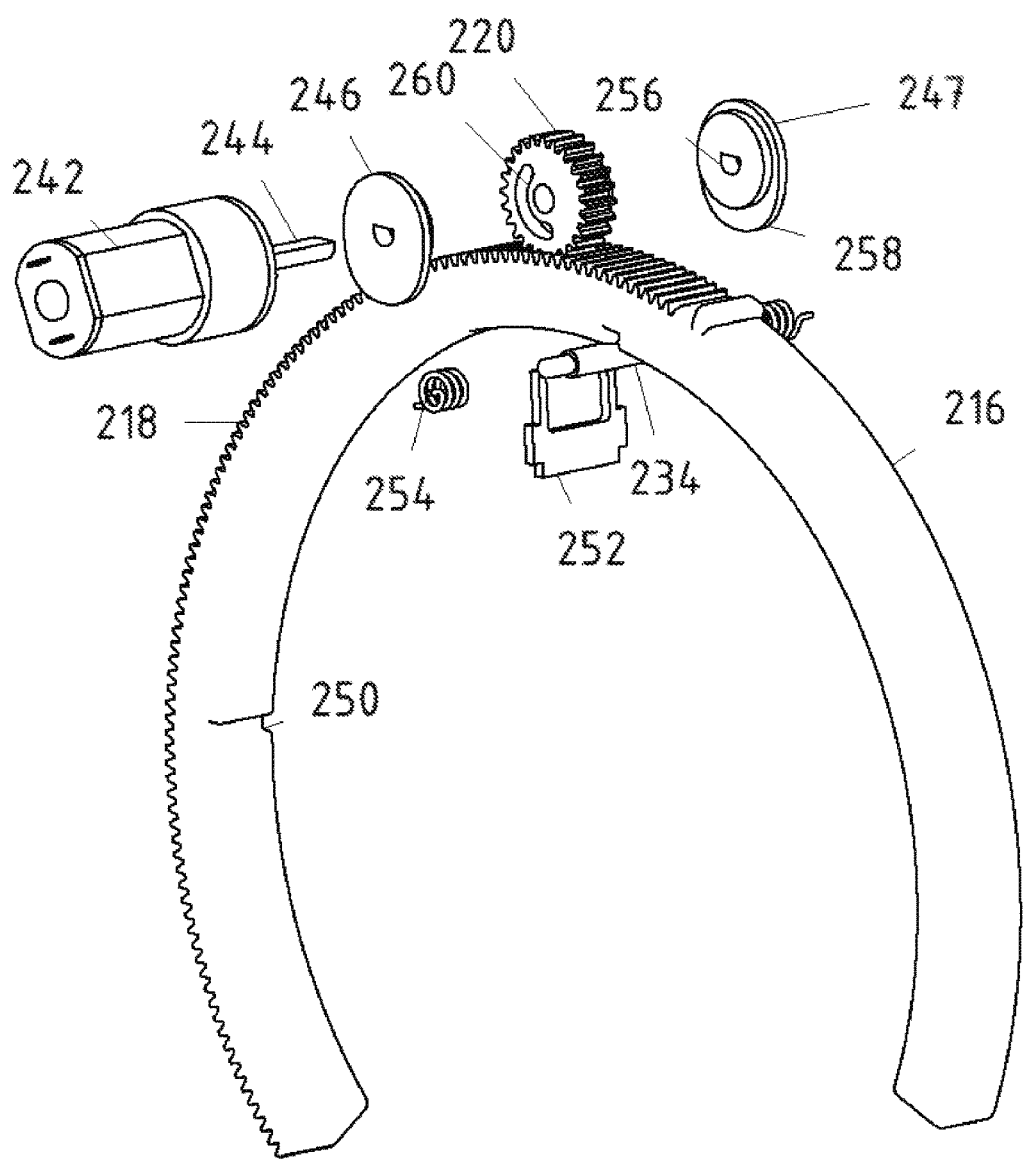
FIG. 12 shows the assembly of FIG. 11 in a second perspective.

FIG. 12 additionally shows the guiding groove 260 of the driving tool 220 and the geometrical form of the cam curve 258 of the unlocking cam 246 and 247 in a further perspective view of FIG. 11.

Figure 13:
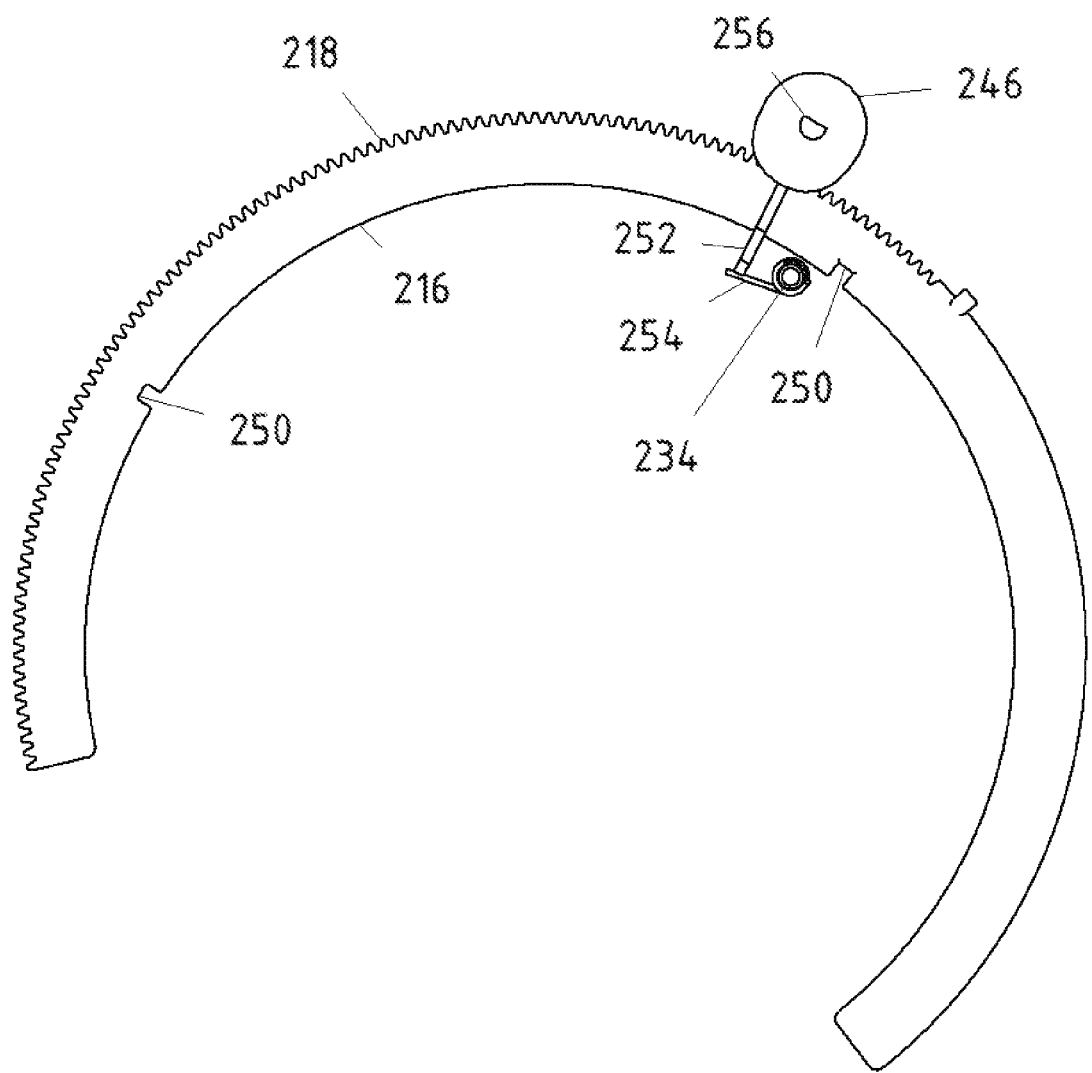
FIG. 13 shows the assembly of FIG. 11 in a release position.

FIG. 13 shows the mechanism of the locking device in a front view. The mechanism is shown in the release position. By compulsory guiding the latch 252 has left a recess 250 of the locking bracket 216 by the motor of the unlocking cam 246 and 247. The locking bracket 216 is rotated by the driving mechanism and leaves the locking position (see FIG. 13).

Figure 14:
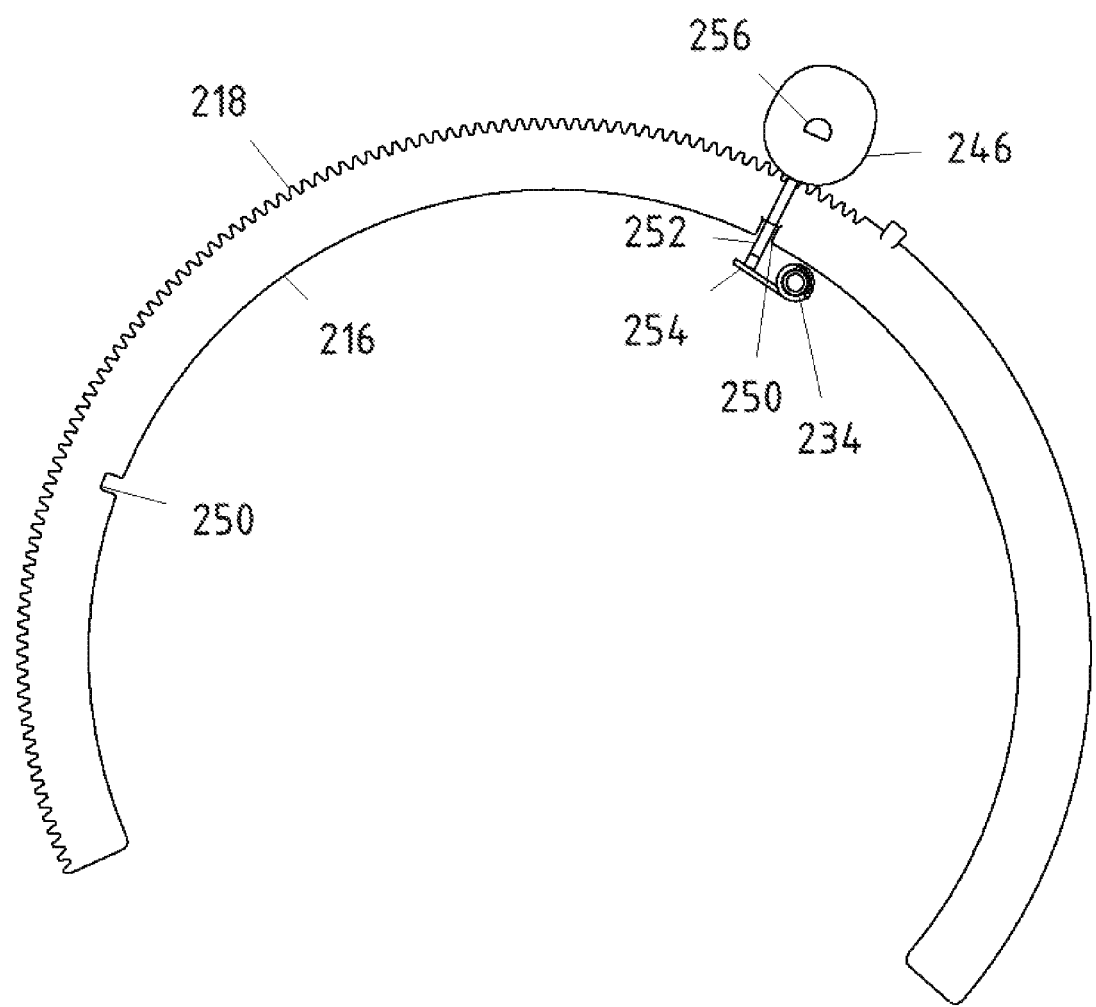
FIG. 14 shows the assembly of FIG. 11 in a locked position.

FIG. 14 shows the mechanism of the locking device as a front view. The mechanism is shown in the locking position. The position of the unlocking cams 246 and 247 enables the latch 252 to engage in the recess 250 of the locking bracket 216 by spring biasing and thereby block the rotational movement of the locking bracket 216.

Figure 15:
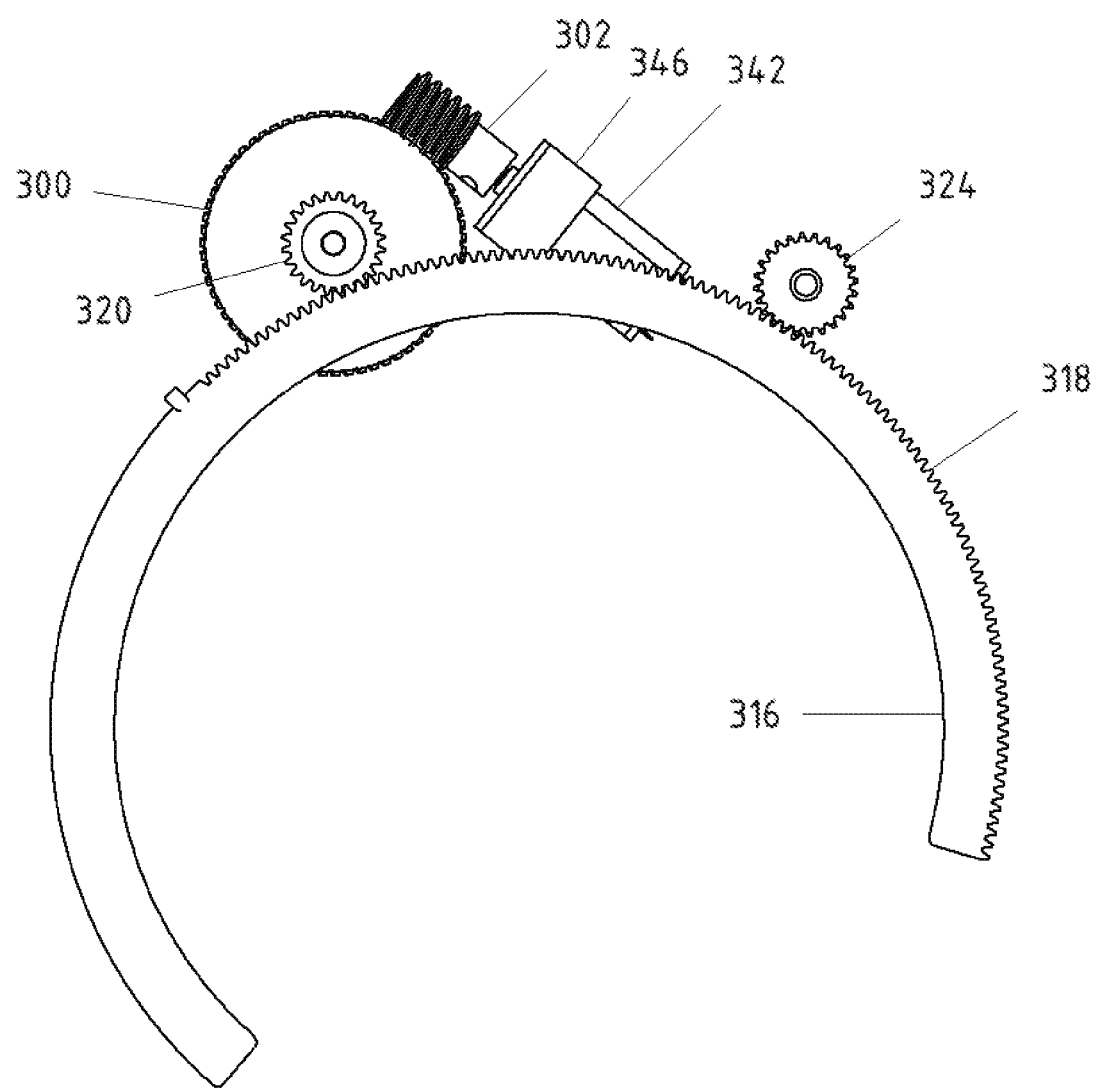
FIG. 15 shows a further, alternative driving principle of the locking bracket by means of a worm drive from the front.

FIG. 15 shows an alternative driving principle by means of a worm gear. A gear worm 302 is fixed on the driving shaft of the driving motor 342. The gear worm positively engages in the worm wheel 300. The worm wheel 300 is positively connected to a driving shaft 344. The driving wheel 320 is also positively connected to such driving shaft 344. The driving wheel 320 positively engages in the gearing 318 of the locking bracket 316. Also the guiding geared wheel 324 engages in the gearing 318 of the locking bracket 316.

Figure 16:
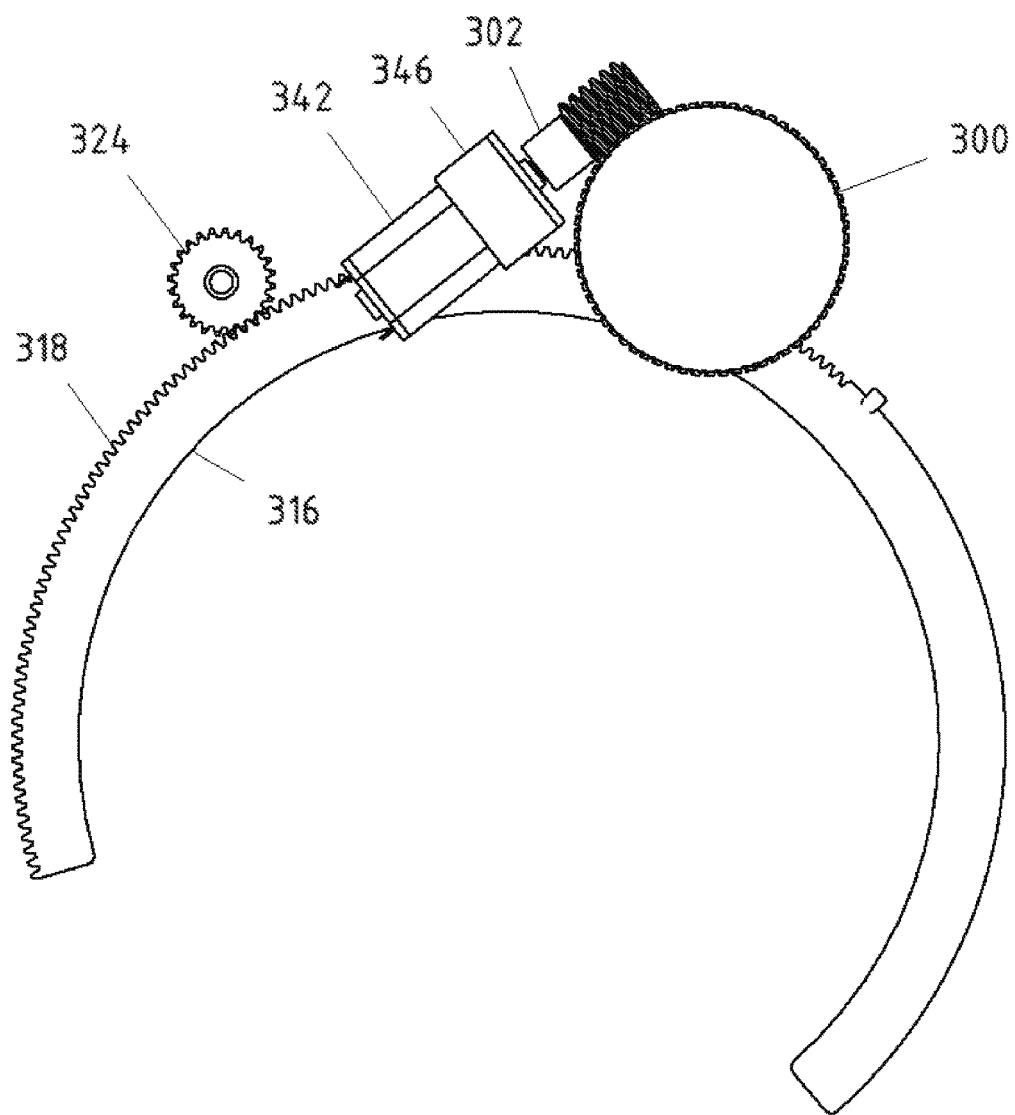
FIG. 16 shows the assembly of FIG. 15 from the back.

FIG. 16 shows the driving principle as a back view.

Figure 17:
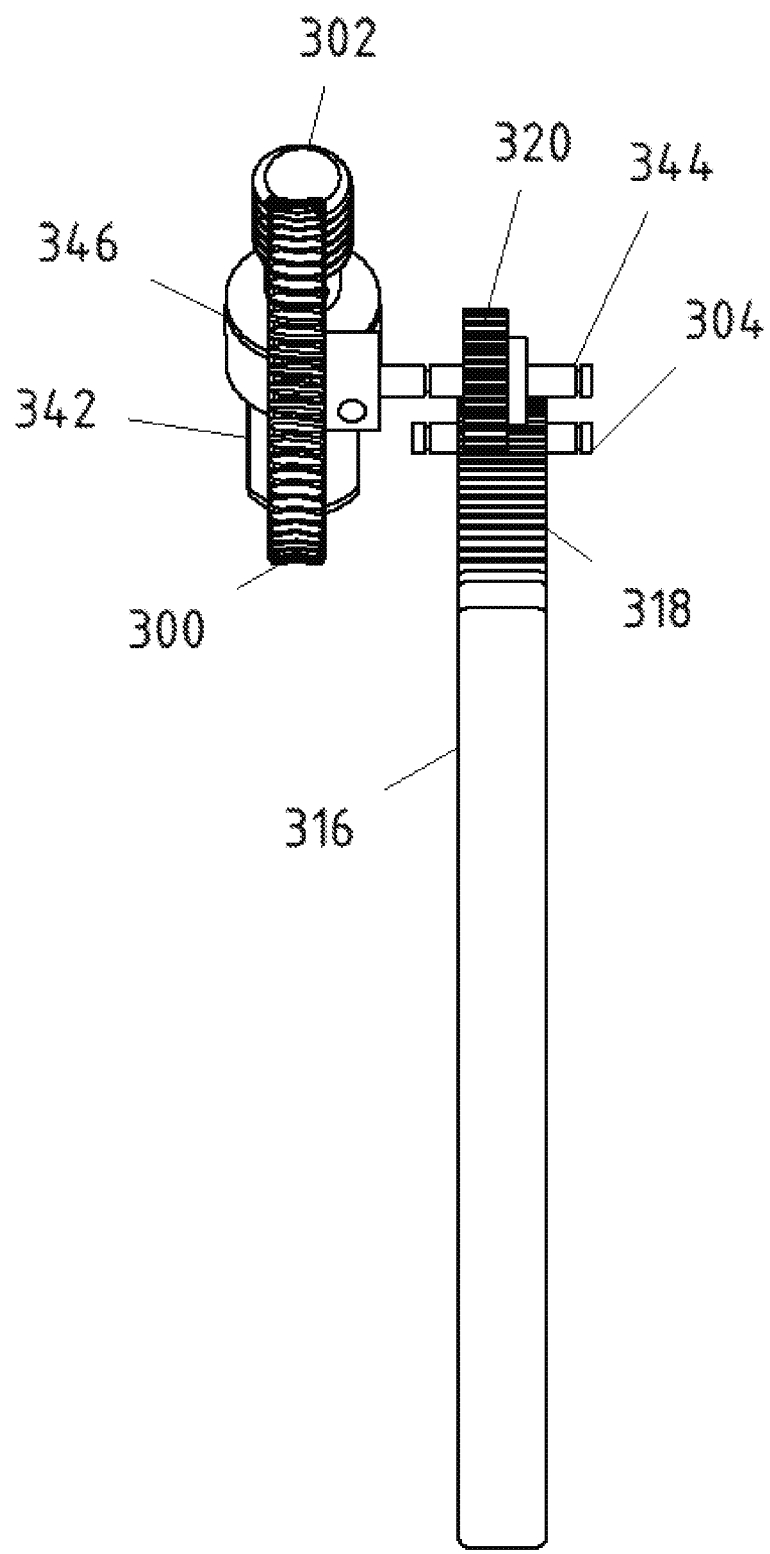
FIG. 17 is a top view of the assembly of FIG. 15.

FIG. 17 shows the driving principle as a top view. In addition to the components which are shown in FIGS. 15 and 16, FIG. 17 shows the driving shaft 344 as well as the shaft 304 of the guiding wheel.

Figure 18:
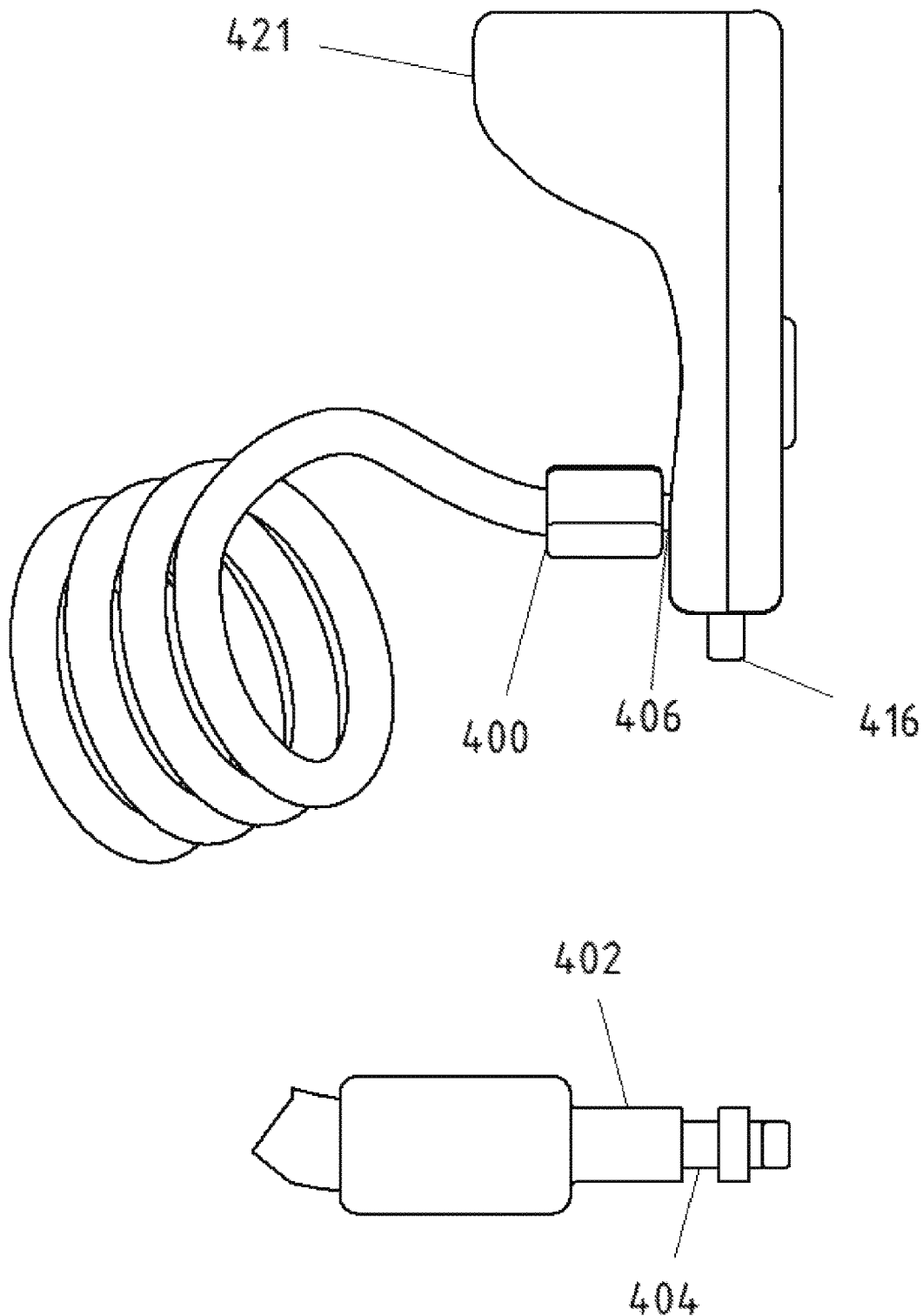
FIG. 18 shows a frame lock with a locking mechanism, which is able to lock an additional steel cable or a steel chain in the frame lock.

FIG. 18 shows a frame lock 421 which is provided with a receiving opening 406 which is suitable to accommodate a bolt 402 and to lock. The bolt 402 is tightly connected to a steel cable and is provided with a circumferential groove 404. The bolt previously inserted into the receiving opening 406 is blocked in the locking position of the locking bracket 146.

The described assembly operates as follows:

In a start situation the locking bracket 16 of the frame lock is in the locking position as shown in FIG. 2. An end position recognition 158 provides a feedback about the initial position to the central control unit 14. The back wheel 56 of the bicycle is blocked by the locking bracket 16 and it is not possible to ride the bicycle.

The bidirectional radio unit 12 of the frame lock periodically sends an identification signal. The mobile bidirectional radio unit 10 is carried by the bicycle owner (for example in his trouser pocket, at a keyring, in a backpack. etc.). The bicycle owner is outside the radio range of the frame lock.

The mobile radio unit 10 periodically searches for the identification signal of the radio unit 12. If the bicycle owner with the mobile radio unit moves into the range of the radio unit 12, a coded radio connection is established therebetween using the identification signal. Once the radio connection is established the determination of the distance between the radio units 10 and 12 starts using a measuring method. The receiving field strength of the incoming radio signal serves as a measuring value. This value is provided by the Generic Attribute Profile (GATT) of the Bluetooth Low Energy Standard. The indicator for the receiving field strength is designated as RSSI (Received Signal Strength Indicator). The higher the measured field strength the less is the distance between the radio units 10 and 12. As long as the field strength does not exceed a certain value the frame lock remains in the locked position. An algorithmic average value method is used for validating the measured values, which considers the dependency of the measuring time of several values for forming a result.

If the bicycle owner falls below a set value to the bicycle the signal strength exceeds a pre-set value. If the threshold value is exceeded a direct approaching of the user is recognized and the opening procedure is started. The difference causing the opening or locking can be set to values between 50 centimeters and 30 meters and can be configured by the user according to his needs.

The central control unit 14 evaluates the results of the field strength measurement and controls the opening procedure depending thereon. The distance-dependent controlling of the opening or locking procedure of the frame lock can be carried out by the mobile end device 116 or by the mobile transponder 188 as well as manually by the frame lock 21 itself. The mobile end device 116, the mobile transponder and the frame lock are provided with corresponding operating elements in the form of sensor keys or other keys.

At first the lifting magnet bolt 41 is pulled from the locking position against the bias of the spring by means of the controller of the lifting magnet 40. Thereby, the opening procedure of the locking bracket 16 is released. The driving motor 42 is supplied with a poled direct current thereafter, such that the connected driving wheel 20 rotates anti-clockwise (see FIG. 2). The gearing converts the rotational movement of the driving wheel 20 to a clockwise rotation of the locking bracket 16. The locking bracket 16 is moved to its end position (see FIG. 1). The lifting magnet bolt 41 is released from its forced position and abuts the side of the locking bracket 16 due to the spring biasing.

When the lifting magnet bolt 41 reaches the recess 17 at the side of the locking bracket the locking bracket 16 is automatically locked. The recognition of the end position 158 indicates the reaching of the open position to the central control unit 14. If the bicycle is used the detection unit for the wheel rotation 50 recognizes the riding operation and the central control unit 14 blocks the locking procedure. Additionally, the tilt and acceleration sensor 48 measures the movement during riding operation or idleness and processed by the central control unit 14.

As long as the process results of the signals indicate a riding operation no locking procedure is started. If in turn idleness of the bicycle is recognized, the radio units 10 and 12 are used for determining the distance between the bicycle owner and the bicycle. As described before a measurement of the field strength of the radio signal is carried out in order to determine the distance.

If the bicycle owner with the mobile radio unit 10 exceeds the pre-set distance to the bicycle the locking procedure is started. For this purpose the central control unit 14 releases the locking of the locking bracket 16 by means of the lifting magnet 40 and controls the movement of the locking bracket 16 in the locking position. Thereby, the frame lock 21 returns to its initial position.

The accumulator 38 supplies the various components of the control unit which is shown in FIG. 5 and alternatively in FIG. 7. As long as the frame lock 21 is in the locking position the signals of the tilt- and acceleration sensor 48 are processed by the central control unit 14. If the measured values exceed a set threshold an acoustic theft alarm is started by means of the signal generator 46. Also, the mobile radio unit 10 can issue an acoustic or haptic notice to the bicycle owner upon attempted theft. Thereby, a manipulation attempt at the bicycle or the carrying away of the bicycle can be reliably recognized.

An alternative assembly operates as follows:

The anti-theft lock is designed as a frame lock 21 for two-wheeled vehicles. The measuring method for recognizing the distance and the driving of the locking bracket 116 are effected in the same way as with the assembly described above. With the alternative embodiment the locking bracket 216 is secured and blocked in the opening and locking position by a spring-biased latch 252. In the initial situation the locking bracket 216 is in the open position. The latch 252 is held by the spring biasing of the springs 254 in the recess 250 of the locking bracket 216 and blocks the movement of the locking bracket 216 against the opening position. The latch is guided sideways by grooves in the plate frame 28 and 31 in the housing and enables a perpendicular movement of the latch 252 against the spring biasing.

If a locking procedure is initiated by the control unit the driving motor 242 is controlled and the driving shaft 244 rotated. The unlocking cams 246 and 247 positively connected to the driving shaft 244 are also rotated therewith. The driving wheel 220 is not positively connected to the driving shaft 244 and, therefore, does not follow the rotation of the driving shaft 244. At first the two unlocking cams 246 and 247 rotate and move the latch 252 against the spring biasing from the recess 250 of the locking bracket 216 due to its cam curve form 258. Thereby, the locking of the locking bracket 216 in the opening position is cancelled.

The unlocking cam 246 is provided with a cam pin in the form of a pin 248. Such pin 248 moves in the groove 260 of the driving wheel 220 abutting the driving shaft 244. As soon as the unlocking cams 246 and 247 move the latch 252 into the release position the cam pin 248 of the unlocking coma 246 reach the end of the groove 260 of the driving wheel 220. In this moment the pin 248 catches the driving wheel 220 due to the positive connection and also rotates the driving wheel 220. The driving wheel 220 in turn moves the locking bracket 216 by a positive connection. It is moved to the locking position.

When the locking bracket 216 reaches the locking position the unlocking cams 246 and 247 are in their original position and the latch 252 is moved into a second recess 250 of the locking bracket 216 by the spring biasing and thereby in a locking position. In this position the locking bracket 216 cannot be moved against the locking position by external impact. During the following controlling and the movement of the locking bracket 216 back to the open position connected therewith the locking device operates again according to the previously described principle.

An Alternative Embodiment Operates as Follows:

The anti-theft lock is designed as a frame lock 21 for two wheeled vehicles. The measuring method for the recognition of the distance and the dependent controlling of the mechanics are carried out according to the same method as the previously described assembly. In this alternative assembly the driving moment is exerted by a worm gear.

When the locking or opening procedure is operated by the control of the frame lock the driving motor 342 which is equipped with a gear block 346 drives a gear worm 302 with its driving shaft which is connected thereto. The rotating gear worm 302 in turn drives a worm wheel 300. The worm wheel 300 drives the driving shaft 344 by a positive connection. The also positively to the driving shaft 344 connected driving gear wheel 320 is rotated and drives the locking bolt 316 by a positive connection.

Depending on the electrically poled rotational direction of the direct current driving motor 342 the locking bracket is either moved to the locking or to the opening position. The advantage of such assembly is the self-impeding effect of the worm gear. Due to such self-impeding effect it is not possible to move the locking bolt by external impact against the initial position. Thereby, an additional locking device of the locking bracket 316 can be avoided.

An Alternative Assembly Operates as Follows:

The anti-theft lock is designed as a frame lock 421 for two-wheeled vehicles. The measuring method for the recognition of the distance and the driving of the locking bracket 416 is the same as with the previously described assembly. The way of operation of this assembly is independent from the driving concept or the locking mechanism of the locking bracket 421. The frame lock 421 is provided with a receiving opening 406 which is suitable to accommodate and to lock a bolt 402. A steel cable 400 or a steel chain (not shown), for example, is tightly connected to the bolt 402. The steel cable 400 or the steel chain (not shown) is suitable to tightly lock the frame lock 421 and thereby the two-wheeled vehicle to the environment, such as, for example, a bicycle stand or a fence. The bolt 402 is provided with a circumferential groove 404. If the bolt 402 is inserted into the receiving opening 406 of the frame lock 421 and the locking procedure is initiated the driven locking bracket 416 moves through the groove 404 of the bolt 402 and tightly locks the bolt 402 in the frame lock. Thereby, the steel cable 400 or the steel chain (not shown) connected to the environment is tightly connected to the frame lock. If an opening procedure is initiated the locking bracket 416 moves out of the groove 404 of the bolt 402 and releases it. With such an assembly the carrying away of the two wheeled vehicle is safely prevented.

The above assemblies were described in great detail. It is understood, however, that they are not meant to limit the protective scope of the patent which is exclusively determined by the patent claims. Many alternatives and means having the same effect are known to the person skilled in the art which can be used without deviating from the basic idea of the present invention. In particular, geometric assembly, materials, sizes and amounts may vary without deviating from the basic idea of the invention.

The invention claimed is:

1. An anti-theft lock for bicycles and other vehicles driven by humans, which is adapted to switch from a locking state wherein the anti-theft lock prevents movement of the vehicle to a move state wherein the anti-theft lock allows movement of the vehicle, comprising:
   means for tamper-proof attachment of said anti-theft lock to the vehicle;
   a control unit for switching said anti-theft lock from a locking state to a move state and vice versa;
   and wherein
   said control unit is provided with a receiver for receiving a wireless transmitted signal from a corresponding mobile transmitter provided in a distance from said receiver, and means for determining said distance to said mobile transmitter;
   said control unit switches the anti-theft lock to a locking state if the distance exceeds a threshold and said control unit determines that said vehicle does not move at the time; and
   said control unit switches said anti-theft lock to a move state if said distance is less than a threshold.

2. The anti-theft lock of claim 1, wherein said lock is adapted to be fixed to the vehicle and is provided with a blocking device for blocking the rotation of a wheel.

3. The anti-theft lock of claim 2, further comprising a motor controlled by the control unit for driving the blocking device.

4. The anti-theft lock of claim 3, wherein said blocking device is a curved locking bracket, adapted to be moved into the range between the spokes of a wheel of said vehicle for locking.

5. The anti-theft lock of claim 4, wherein the locking bracket is provided with a geared angular range for engaging a gear wheel driven by a motor.

6. An anti-theft lock for bicycles and other vehicles driven by humans, which is adapted to switch from a locking state wherein the anti-theft lock prevents movement of the vehicle to a move state wherein the anti-theft lock allows movement of the vehicle, comprising:
  means for tamper-proof attachment of said anti-theft lock to the vehicle;
  a control unit for switching said anti-theft lock from a locking state to a move state and vice versa;
  wherein
  said control unit is provided with a receiver for receiving a wireless transmitted signal from a corresponding mobile transmitter provided in a distance from said receiver, and means for determining said distance to said mobile transmitter;
  said control unit switches the anti-theft lock to a locking state if the distance exceeds a distance threshold configured by the user and said control unit determines that said vehicle does not move at the time; and
  said control unit switches said anti-theft lock to a move state if said distance is less than the distance threshold;
  wherein said control unit and said mobile transmitter comprise bidirectional communicating transmitter and receiver units, said transmitter and receiver units adapted to exchange a signal having strength and wherein said distance is determined from the signal strength of said signal exchanged between said control unit and said mobile transmitter.

7. The anti-theft lock of claim 1, wherein said receiver in said control unit is adapted to receive and process the signals of a smart phone, a tablet computer or any other mobile end device.

8. An anti-theft lock for bicycles and other vehicles driven by humans, which is adapted to switch from a locking state preventing movement of the vehicle to a move state allowing movement of the vehicle, comprising:
  means for tamper-proof attachment of said anti-theft lock to the vehicle;
  a control unit for switching said anti-theft lock from a locking state to a move state and vice versa; and
  a sensor to determine the rotational speed of a vehicle wheel and a control algorithm to enable the recognition of riding operation and preventing a locking procedure during riding;
  wherein
  said control unit is provided with a receiver for receiving a wireless transmitted signal from a corresponding mobile transmitter provided in a distance from said receiver, and means for determining said distance to said mobile transmitter;
  said control unit switches the anti-theft lock to a locking state if the distance exceeds a threshold and said vehicle does not move at the time; and
  said control unit switches said anti-theft lock to a move state if said distance is less than a threshold.

9. The anti-theft lock of claim 1, further comprising a tilt and/or motion sensor.

10. The anti-theft lock of claim 1, wherein said vehicle is adapted to move and said anti-theft lock further comprising an accumulator adapted to be recharged by the vehicle movement or a battery cell for providing the control unit and/or the sensors with electrical energy.

11. The anti-theft lock of claim 1, further comprising sensors for detecting untypical states and optical and/or acoustic means for generating a warning signal upon the occurrence of an untypical state.

12. The anti-theft lock of claim 6, wherein said lock is adapted to be fixed to the vehicle and is provided with a blocking device for blocking the rotation of a wheel.

13. The anti-theft lock of claim 12, further comprising a motor controlled by the control unit for driving the blocking device.

14. The anti-theft lock of claim 13, wherein said blocking device is a curved locking bracket, adapted to be moved into the range between the spokes of a wheel of said vehicle for locking.

15. The anti-theft lock of claim 14, wherein the locking bracket is provided with a geared angular range for engaging a gear wheel driven by a motor.

16. The anti-theft lock of claim 6, wherein said receiver in said control unit is adapted to receive and process the signals of a smart phone, a tablet computer or any other mobile end device.

17. The anti-theft lock of claim 8, wherein said lock is adapted to be fixed to the vehicle and is provided with a blocking device for blocking the rotation of a wheel.

18. The anti-theft lock of claim 17, further comprising a motor controlled by the control unit for driving the blocking device.

19. The anti-theft lock of claim 18, wherein said blocking device is a curved locking bracket, adapted to be moved into the range between the spokes of a wheel of said vehicle for locking.

20. The anti-theft lock of claim 19, wherein the locking bracket is provided with a geared angular range for engaging a gear wheel driven by a motor.

* * * * *